United States Patent
Crews et al.

(10) Patent No.: US 9,169,431 B2
(45) Date of Patent: Oct. 27, 2015

(54) METHOD TO COMPLEX METALS IN AQUEOUS TREATING FLUIDS FOR VES-GELLED FLUIDS

(75) Inventors: James B. Crews, Willis, TX (US); Tianping Huang, Spring, TX (US)

(73) Assignee: BAKER HUGHES INCORPORATED, Houston, TX (US)

( * ) Notice: Subject to any disclaimer, the term of this patent is extended or adjusted under 35 U.S.C. 154(b) by 1041 days.

(21) Appl. No.: 13/270,025

(22) Filed: Oct. 10, 2011

(65) Prior Publication Data

US 2013/0090270 A1    Apr. 11, 2013

(51) Int. Cl.
| | | |
|---|---|---|
| C09K 8/58 | (2006.01) | |
| C09K 8/68 | (2006.01) | |
| C09K 8/66 | (2006.01) | |
| C09K 8/70 | (2006.01) | |
| B82Y 30/00 | (2011.01) | |

(52) U.S. Cl.
CPC . *C09K 8/665* (2013.01); *C09K 8/68* (2013.01); *C09K 8/70* (2013.01); *B82Y 30/00* (2013.01); *C09K 2208/10* (2013.01); *C09K 2208/30* (2013.01)

(58) Field of Classification Search
None
See application file for complete search history.

(56) References Cited

U.S. PATENT DOCUMENTS

| | | | |
|---|---|---|---|
| 5,964,295 A | 10/1999 | Brown et al. | |
| 5,979,555 A | 11/1999 | Gadberry et al. | |
| 6,239,183 B1 | 5/2001 | Farmer et al. | |
| 6,831,108 B2 * | 12/2004 | Dahanayake et al. | 516/69 |
| 7,595,284 B2 | 9/2009 | Crews | |
| 7,939,472 B2 | 5/2011 | Crews | |
| 2009/0192053 A1 * | 7/2009 | Crews et al. | 507/201 |
| 2011/0284228 A1 * | 11/2011 | Huang et al. | 166/308.1 |

OTHER PUBLICATIONS

Nasr-EI-Din, H. A., et al., "Lessons Learned and Guidelines for Matrix Acidizing With Viscoelastic Surfactant Diversion in Carbonate Formations," SPE 102468, pp. 1-11, SPE Annual Technical Conference, San Antonio, TX, Sep. 24-27, 2006.

* cited by examiner

*Primary Examiner* — John J Figueroa
(74) *Attorney, Agent, or Firm* — Mossman Kumar & Tyler PC

(57) ABSTRACT

Aqueous treating fluids may include a viscoelastic surfactant (VES) and an aqueous base fluid, e.g. a drilling fluid, whereby the VES may increase and/or maintain the viscosity of the aqueous treating fluid. Metal ions may be present within the aqueous treating fluid that break, reduce, and/or digest the VES within the aqueous treating fluid. An effective amount of complexation particles may be added to the aqueous treating fluid for complexing at least a portion of these metal ions and thereby disallowing the metal ions from breaking, reducing, and/or altering the VES within the aqueous treating fluid.

14 Claims, 2 Drawing Sheets

METHOD TO COMPLEX METALS IN AQUEOUS TREATING FLUIDS FOR VES-GELLED FLUIDS

TECHNICAL FIELD

The present invention relates to a method for inhibiting or preventing the degradation of a viscoelastic surfactant (VES) by metal ions present in an aqueous treating fluid gelled with the VES by adding an effective amount of complexation particles to an aqueous treating fluid to complex any metal ions present therein.

BACKGROUND

Hydraulic fracturing is a method of using pump rate and hydraulic pressure to fracture or crack a subterranean formation in a process for improving the recovery of hydrocarbons from the formation. Once the crack or cracks are made, high permeability proppant, relative to the formation permeability, is pumped into the fracture to prop open the crack. When the applied pump rates and pressures are reduced or removed from the formation, the crack or fracture cannot close or heal completely because the high permeability proppant keeps the crack open. The propped crack or fracture provides a high permeability path connecting the producing wellbore to a larger formation area to enhance the production of hydrocarbons. The development of suitable fracturing fluids is a complex art because the fluids must simultaneously meet a number of conditions. For example, they must be stable at high temperatures and/or high pump rates and shear rates that can cause the fluids to degrade and prematurely settle out the proppant before the fracturing operation is complete. Various fluids have been developed, but most commercially used fracturing fluids are aqueous based liquids that have either been gelled or foamed. When the fluids are gelled, typically a polymeric gelling agent, such as a solvatable polysaccharide, for example guar and derivatized guar polysaccharides, is used. The thickened or gelled fluid helps keep the proppants within the fluid. Gelling can be accomplished or improved by the use of crosslinking agents or cross-linkers that promote crosslinking of the polymers together, thereby increasing the viscosity of the fluid. One of the more common crosslinked polymeric fluids is borate crosslinked guar.

The recovery of fracturing fluids may be accomplished by reducing the viscosity of the fluid to a low value so that it may flow naturally from the formation under the influence of formation fluids. Crosslinked gels generally require viscosity breakers to be injected to reduce the viscosity or "break" the gel. Enzymes, oxidizers, and acids are known polymer viscosity breakers.

While polymers have been used in the past as gelling agents in fracturing fluids to carry or suspend solid particles as noted, such polymers require separate breaker compositions to be injected to reduce the viscosity. Further, such polymers tend to leave a coating on the proppant and a filter cake of dehydrated polymer on the fracture face even after the gelled fluid is broken. The coating and/or the filter cake may interfere with the functioning of the proppant. Studies have also shown that "fish-eyes" and/or "micro-gels" present in some polymer gelled carrier fluids will plug pore throats, leading to impaired leakoff and causing formation damage.

Aqueous drilling and treating fluids may be gelled or have their viscosity increased by the use of non-polymeric viscoelastic surfactants (VES). These VES materials are advantageous over the use of polymer gelling agents in that they do not leave a filter cake on the formation face, do not coat the proppant or create micro-gels or "fish-eyes", and have reduced potential for damaging the formation relative to polymers. However, many aqueous base fluids, e.g. a brine, prepared in field operations become contaminated with metal ions and particles due to metal corrosion.

These metal ions may be present because of impurities in the salt products used to prepare aqueous base fluids and/or aqueous treating fluids or from metal surfaces of mixing and handling equipment. It is well know that saline water may corrode, leech and/or dissolve metal ions from metal surfaces and metal-scale particles. In one non-limiting example, the metal ions may be from the source water of the aqueous base fluid or may be due to the corrosion of metal surfaces from brine mixing systems and/or stocking tanks. In another non-limiting example, the source of the metal ions may be from the metal surfaces and/or scale in piping, valves, and pumps that may be used to transfer the brines. In still another non-limiting example, the metal ions may be from the equipment used to mix an aqueous treating fluid. In yet another non-limiting example, the metal ions may be from the VES product or other additive, or from the wellbore tubing or casing utilized during the VES treatment.

The contamination by metal ions may occur from many different types of sources, but regardless of the source, the metal ions alter the VES into an undesirable form. The presence of the metal ions may degrade, redox, or alter the VES gel viscosity haphazardly and uncontrollably, in some cases even upon fluid heat-up. In such cases the redox reactions by metal ions is certainly unwanted.

It would be desirable if the metal ions within the aqueous treating fluid could be complexed and thereby prevent the degradation and/or redox of the VES by the metal ions.

SUMMARY

There is provided, in one form, a method for inhibiting or preventing the degradation of a viscoelastic surfactant (VES) by metal ions present in an aqueous treating fluid. An effective amount of complexation particles may be added to the aqueous treating fluid to complex at least a portion of the metal ions present in the aqueous treating fluid. The aqueous treating fluid may include at least one VES and an aqueous base fluid.

In an alternative non-limiting embodiment, the effective amount of complexation particles added to the aqueous treating fluid may range from about 0.0001 wt % to about 0.5 wt %. The size of the complexation particles may range from about 1 nm to about 50 microns.

There is further provided in another non-limiting embodiment where the method may include preventing the degradation of the viscoelastic surfactant (VES) by the metal ions present in the aqueous treating fluid compared to an otherwise identical method absent the complexation particles. The metal ions may be present in the aqueous treating fluid in an amount ranging from about 0.1 mg/L to about 10,000 mg/L. The metal ions may include, but are not necessarily limited to a transition metal selected from the group consisting of Groups VA, VIA, VIIA, VIIIA, IE, IIB, IIIB, and IVB of the Periodic Table, and combinations thereof.

The complexation particles added to an aqueous treating fluid may complex the metal ions within the aqueous treating fluid and thereby prevent or inhibit the metal ions from binding and/or reacting with the VES. The addition of complexation particles appears to enhance the ability of a VES to increase and/or maintain the viscosity of an aqueous treating fluid even when the VES of the aqueous treating fluid is also in the presence of the metal ions.

DETAILED DESCRIPTION

Figure 1:
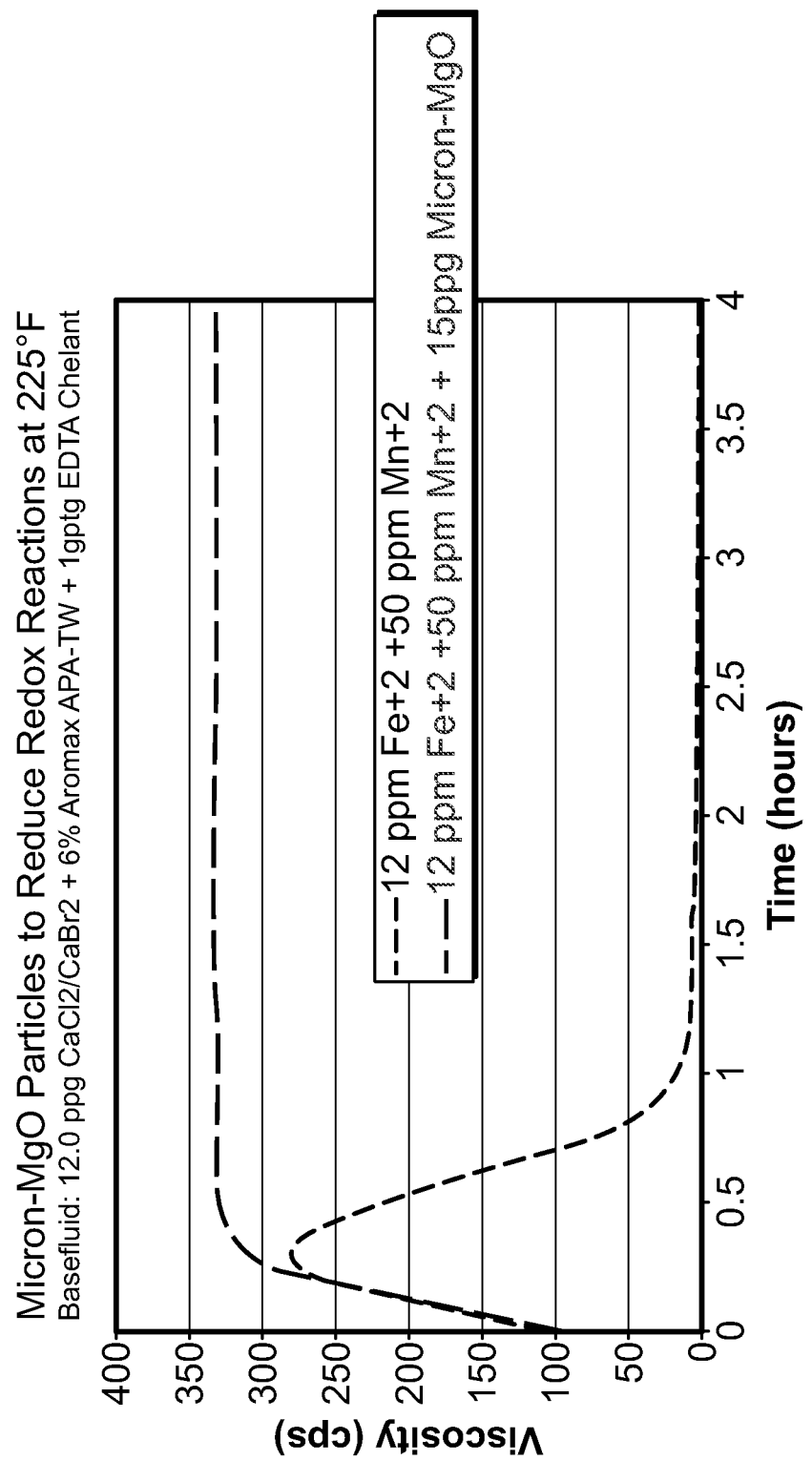
FIG. 1 is a graph illustrating the viscosity measured over time after adding micron-sized MgO particles to an aqueous treating fluid.

Many viscoelastic surfactant (VES) fluid systems use aqueous base fluids, such as but not limited to a completion fluid or brine, as a mixwater for the fluid system. These aqueous base fluid may include sodium chloride, potassium chloride, calcium chloride, sodium bromide, zinc bromide, and/or calcium bromide brines. The types of aqueous base fluids typically mixed and used in oilfield operations have metal ions disposed therein that can redox or degrade the VES compound within the VES fluid system quickly at temperatures above 150° F.

The aqueous treating fluid may include, but is not limited to an aqueous base fluid, and a viscoelastic surfactant (VES). It has been discovered that the addition of an effective amount of complexation particles to an aqueous treating fluid may complex at least a portion of the metal ions present therein after the addition of the complexation particles. The metal ions may be attracted, attached, adsorbed, surface reacted, and the like with the complexation particles. Thus, the complexation particles may temporarily or permanently inactivate the metal ions and thereby prevent or inhibit the metal ions from binding and/or reacting with the VES. Prevent or inhibit is defined herein to mean that the complexation particles may suppress or reduce the amount of alteration of the VES molecules within the aqueous treating fluid. That is, it is not necessary for alteration to the VES to be entirely prevented for the methods discussed herein to be considered effective, although complete prevention is a desirable goal.

A fracturing or other fluid can be designed to have controlled breaking characteristics by complexing the metal ions until it is desirable for the VES molecule to be degraded by a non-metallic internal breaker component. Importantly, better clean-up of the aqueous treatment fluid from the fracture and wellbore can be achieved thereby if metal redox degradation of VES molecules is controlled, decreased or prevented by complexation particles. Better clean-up of the aqueous treatment fluid directly influences the success of the fracture treatment, which is an enhancement of the well's hydrocarbon productivity.

The effective amount of complexation particles may range from about 0.0001 wt % to about 0.5 wt % of the total aqueous treating fluid, or alternatively from about 0.0005 wt % independently to about 0.1 wt %, or from about 0.001 wt % independently to about 0.025 wt % in another non-limiting embodiment. The size of the complexation particles may range from about 1 nm independently to about 50 microns, from about 4 nm independently to about 10 microns, from about 8 nm independently to about 1 micron, or alternatively from about 10 nm independently to about 200 nm in another non-limiting embodiment.

The complexation particles may be or include, but are not limited to high cation exchange capacity phyllosilicate mineral particles, zeolites, alkaline earth metal oxides and hydroxides, $TiO_2$, ZnO, $Al_2O_3$, and combinations thereof. The high cation exchange capacity phyllosilicate mineral particles may include but are not limited to hectorite, vermiculite, montmorillonite, bentonite, and the like. The zeolites may be or include, but are not necessary limited to chabazite, mordenite, clinoptilite, zeolite A, zeolite X, zeolite ZSM-5, and the like. Examples of the alkaline earth metal hydroxide/oxides may include but are not limited to MgO, $Mg(OH)_2$, CaO, $Ca(OH)_2$, and the like. In an alternative embodiment, the complexation particles may be nano-sized particles selected from the group consisting of $TiO_2$, ZnO, $Al_2O_3$, and combinations thereof, wherein the nano-sized particles are less than 100 nm, or from about 4 nm independently to about 60 nm in a non-limiting embodiment. As used herein with respect to a range, "independently" means that any lower threshold may be used together with any upper threshold to give a suitable alternative range.

The complexation particles prevent and/or inhibit the metal ions from digesting/reacting or altering of the VES molecules. The term "alter" and any variations of the word "alter" are used herein to mean any change to the VES compound itself such that the utility of the VES decreases, i.e. decreasing the ability of the VES to form, maintain, and/or sustain viscous micelle structures. In some non-limiting instances, the VES molecules may be altered in such a way by the metal ions such that the VES molecules may no longer form, maintain, and/or sustain viscous micelle structures. Examples of the alteration to the VES caused by the metal ions in the absence of the complexation particles may include, but are not limited to: (i) a rearrangement of bonds on the VES, (ii) an addition to the VES (such as hydrogen, water molecule, etc.) or (iii) an elimination (decomposition or degradation) of the VES, e.g. where the VES after alteration now equals two or more other compounds.

The primary reaction of the metal ions that chemically alters the VES structure is believed to be a redox reaction, without necessarily being limited by this explanation, and this reaction is thereby decreased when the metal ions are complexed with the complexation particles. A "redox" reaction is defined herein to be any reaction in which electrons are removed from one molecule or atom and given to another molecule or atom. In the processes described herein, such redox reactions are transition metal-mediated.

Regardless of the source of the metal ions, the complexation particles may target metal ions selected from metals including, but not necessarily limited to, Groups VA, VIA, VIIA, VIIIA, IE, IIB, IIIB and IVB of the Periodic Table (previous IUPAC American Group notation), such as iron, copper, manganese, cobalt, zinc, nickel, chrome, vanadium, platinum, tin, aluminum, molybdenum, platinum, palladium, and mixtures thereof. The metal ions may be present in the aqueous treating fluid in an amount ranging from about 0.1 mg/L to about 10,000 mg/L, or from about 0.5 mg/L independently to about 1000 mg/L, alternatively from about 1 mg/L independently to about 200 mg/L.

The viscoelastic surfactants may include, but are not necessarily limited to, non-ionic, cationic, amphoteric, and zwitterionic surfactants. Specific examples of zwitterionic/amphoteric surfactants include, but are not necessarily limited to, dihydroxyl alkyl glycinate, alkyl ampho acetate or propionate, alkyl betaine, alkyl amidopropyl betaine and alkylimino mono- or di-propionates derived from certain waxes, fats and oils. Quaternary amine surfactants are typically cationic, and the betaines are typically zwitterionic. The thickening agent may be used in conjunction with an inorganic water-soluble salt or organic additive such as phthalic acid, salicylic acid or their salts.

Some non-ionic fluids are inherently less damaging to the producing formations than cationic fluid types, and are more efficacious per pound than anionic gelling agents. Amine oxide viscoelastic surfactants, such as but not limited to APA-T, sold by Baker Hughes as SurFRAQ™ VES, have the potential to offer more gelling power per pound, making it less expensive than other fluids of this type. SurFRAQ™ is a VES liquid product that is 50% APA-T and 50% propylene glycol. Materials sold under U.S. Pat. No. 5,964,295 include ClearFRAC™, which may also comprise greater than 10% of a glycol. These viscoelastic surfactants are capable of gelling aqueous solutions to form a gelled base fluid. Diamond FRAQ™ which is a VES system, similar to SurFRAQ™, sold by Baker Hughes may also be used with the VES system. Other commonly known materials as Aromox APA-T manufactured by Akzo Nobel and other known viscoelastic surfactant gelling agents common to stimulation treatment of subterranean formations may also be used within the aqueous treating fluid.

The amount of VES included in the fracturing fluid depends on at least two factors. One involves generating enough viscosity to control the rate of fluid leak off into the pores of the fracture, and the second involves creating a viscosity high enough to keep the proppant particles suspended therein during the fluid injecting step, in the non-limiting case of a fracturing fluid. Thus, depending on the application, the VES is added to the aqueous base fluid in concentrations ranging from about 0.5% independently to about 25% by volume, alternatively up to about 12 vol % of the total aqueous treating fluid (from about 5 gptg independently to about 120 gptg). In another non-limiting embodiment, the range for VES within the aqueous treating fluid may be from about 1.0% independently to about 10.0% by volume VES. In an alternate embodiment, the amount of VES ranges from about 2% independently to about 6% by volume.

It is expected that the complexation particles may be used to complex the metal ions that may be present within a VES system. For instance, the complexation particles could be used in all VES applications including, but not limited to, VES-gelled friction reducers, VES viscosifiers for loss circulation pills, fracturing fluids, gravel packing fluids, viscosifiers used as diverters in acidizing, VES viscosifiers used to clean up drilling mud filter cake, perforating fluids, remedial clean-up of fluids after a VES treatment (post-VES treatment), and the like.

Any suitable mixing apparatus may be used to incorporate the complexation particles into an aqueous base fluid or an aqueous treating fluid. In the case of batch mixing, the VES and the aqueous base fluid are blended for a period of time sufficient to form a gelled or viscosified solution. The VES may be any of the VES systems that are familiar to those in the well service industry, and may include, but are not limited to, amines, amine salts, quaternary ammonium salts, amidoamine oxides, amine oxides, mixtures thereof and the like. Suitable amines, amine salts, quaternary ammonium salts, amidoamine oxides, and other surfactants are described in U.S. Pat. Nos. 5,964,295; 5,979,555; and 6,239,183, incorporated herein by reference.

Viscoelastic surfactants improve the fracturing (frac) fluid performance through the use of a polymer-free system. These systems offer improved viscosity breaking, higher sand transport capability, are more easily recovered after treatment, and are relatively non-damaging to the reservoir. The systems are also more easily mixed "on the fly" in field operations and do not require numerous co-additives in the fluid system, as do some prior systems.

The aqueous treating fluid, as a non-limiting example, is first prepared by blending a VES into an aqueous base fluid. The aqueous base fluid could be, for example, water, brine, aqueous-based foams or water-alcohol mixtures. Any suitable mixing apparatus may be used for this procedure. In the case of batch mixing, the VES and the aqueous base fluid are blended for a period of time sufficient to form a gelled or viscosified solution. The complexation particles may be added to either the aqueous base fluid, i.e. before the VES had been mixed with the aqueous base fluid, or the complexation particles may be added to the aqueous treating fluid, i.e. after the VES has been mixed with the aqueous base fluid.

Propping agents are typically added to the base fluid after the addition of the VES. Propping agents include, but are not limited to, for instance, quartz sand grains, glass and ceramic beads, bauxite grains, walnut shell fragments, aluminum pellets, nylon pellets, and the like. The propping agents are normally used in concentrations between about 1 pound per gallon independently to 14 pounds per gallon (120-1700 kg/m$^3$) of fracturing fluid, but higher or lower concentrations can be used as the fracture design required. The aqueous treating fluid may also contain other conventional additives common to the well service industry such as water wetting surfactants, non-emulsifiers and the like. As noted, the base fluid may also contain other non-conventional additives which can contribute to the complexing of the metal ions and/or the VES within the VES fluid.

In a typical fracturing operation, the fracturing fluid is pumped at a rate sufficient to initiate and propagate a fracture in the formation and to place propping agents into the fracture. A typical fracturing treatment would be conducted by mixing a 20.0 to 60.0 gallon/1000 gallon water (volume/volume—the same values may be used with any SI volume unit, e.g. 60.0 liters/-1000 liters) of a VES, such as SurFRAQ™ in a non-limiting embodiment, in a 2% (w/v) (166 lb/1000 gal, 19.9 kg/m$^3$) KCl solution at a pH ranging from about 6.0 to about 8.0.

There is provided, in one form, a method for inhibiting or preventing the degradation of a viscoelastic surfactant (VES) present in an aqueous treating fluid by metal ions. In an alternative embodiment, the complexation particles delay the gelled-VES fluid from being broken by the metal ions that may be present. An effective amount of complexation particles may be added to the aqueous treating fluid to complex at least a portion of the metal ions present therein. The aqueous treating fluid may include at least one VES and an aqueous base fluid.

The method may be effective at temperatures ranging from about 120° F. independently to about 550° F., or from about 140° F. independently to about 450° F., from about 160° F. independently to about 400° F. in an alternative embodiment, or from about 180° F. independently to about 350° F. in a non-limiting embodiment. The method may be effective at pressures ranging from about independently to about 0 psi, or alternatively from about 100 psi independently to about 25,000 psi in another non-limiting embodiment.

The invention will be further described with respect to the following Examples which are not meant to limit the invention, but rather to further illustrate the various embodiments.

FIG. 1 is a graph illustrating the viscosity measured after adding micron-sized MgO particles to an aqueous treating fluid to reduce the quantity of redox reactions within by the metal ions with the VES within the aqueous treating fluid. The aqueous base fluid had 12.0 ppg CaCl$_2$/CaBr$_2$, 6% Aromox APA-TW from Akzo Nobel and 1 gptg (gallons per thousand gallons) of a diammonium dihydrogen EDTA chelant product from Akzo Nobel (hereinafter referred to as 'the EDTA chelant'). As represented by the graph, the addition of micron-sized MgO particles to an aqueous treating fluid allows the aqueous treating fluid to maintain a higher viscosity over a longer period of time. Thus, the micron-sized MgO disabled the metal ions from reacting with the VES. Additionally, the presence of the EDTA chelant in the absence of the micron-sized MgO did not prevent degradation of the VES within the aqueous treating fluid by the metal ions.

Figure 2:
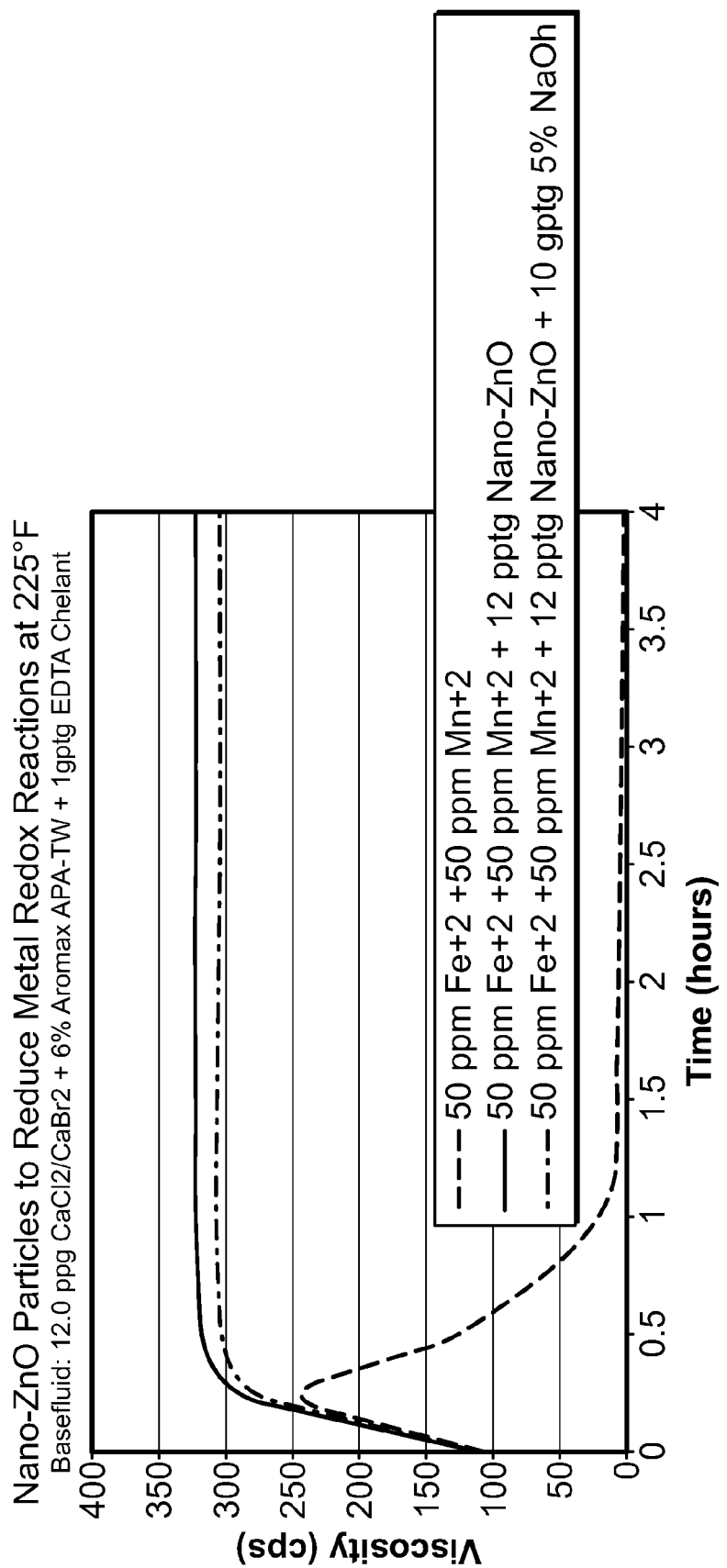
FIG. 2 is a graph illustrating the viscosity measured over time after adding nano-sized ZnO particles to an aqueous treating fluid.

FIG. 2 is a graph illustrating the viscosity measured after adding nano-sized ZnO particles to an aqueous base fluid. The aqueous base fluid had 12.0 ppg $CaCl_2/CaBr_2$, 6% Aromox APA-TW from Akzo Nobel, and 1 gptg (gallons per thousand gallons) of the EDTA chelant product from Akzo Nobel. As represented by the graph, the aqueous treating fluid maintained a higher viscosity over a longer period of time with the addition of nano-sized ZnO particles to the aqueous treating fluid. The presence of the EDTA chelant in the absence of the nano-sized ZnO particles did not prevent the degradation of the VES of the aqueous treating fluid. Additionally, the addition of 5% NaOH to the aqueous treating fluid that precipitates metal ions, with the nano-sized ZnO particles had a lower viscosity over time than the addition of the nano-sized ZnO alone, as represented by the graph. Thus, the metal complexation potential of hydroxyl ions were of no additional benefit or improvement to the nano-sized ZnO particles in complexing the metal ions present in the fluid. Regardless, the addition of the nano-ZnO disabled the metal ions from reacting with the VES.

In the foregoing specification, the invention has been described with reference to specific embodiments thereof, and has been described as effective in providing methods for inhibiting or preventing the degradation of a viscoelastic surfactant (VES) by metal ions that may be present. However, it will be evident that various modifications and changes can be made thereto without departing from the broader spirit or scope of the invention as set forth in the appended claims. Accordingly, the specification is to be regarded in an illustrative rather than a restrictive sense. For example, aqueous base fluids, viscoelastic surfactants, complexation particles, and metal ions falling within the claimed parameters, but not specifically identified or tried in a particular method, are expected to be within the scope of this invention.

The present invention may suitably comprise, consist or consist essentially of the elements disclosed and may be practiced in the absence of an element not disclosed. For instance, the method may consist of or consist essentially of a method for inhibiting or preventing the degradation of a viscoelastic surfactant (VES) by metal ions present in an aqueous treating fluid that may include adding an effective amount of complexation particles to the aqueous treating fluid to complex at least a portion of the metal ions present therein where the aqueous treating fluid may have or include at least one VES and an aqueous base fluid.

The words "comprising" and "comprises" as used throughout the claims, are to be interpreted to mean "including but not limited to" and "includes but not limited to", respectively.

What is claimed is:

1. A method for inhibiting or preventing the degradation of a viscoelastic surfactant (VES) comprising adding an effective amount of complexation particles to an aqueous treating fluid having metal ions disposed therein, whereby the effective amount of complexation particles complex at least a portion of the metal ions, and wherein the aqueous treating fluid comprises at least one VES and an aqueous base fluid, wherein the metal ions are selected from the group consisting of a transition metal selected from the group consisting of Groups VA, VIA, VIIA, VIIIA, IE, IIB, IIIB, and IVB of the Periodic Table, and combinations thereof and are those present from impurities in salt products from the aqueous base fluids, aqueous treating fluids, or source water, those present from metal surfaces of mixing and handling equipment, piping, valves, and pumps, wellbore tubing or casing, those present from metal-scale particles, those due to the corrosion of metal surfaces from brine mixing systems and/or stocking tanks, and combinations thereof, and wherein the complexation particles are selected from the group consisting of high cation exchange capacity phyllosilicate mineral particles, zeolites, alkaline earth metal oxides and hydroxides, $TiO_2$ ZnO, $Al_2O_3$, and combinations thereof.

2. The method of claim 1, wherein the effective amount of complexation particles added to the aqueous treating fluid ranges from about 0.0001 wt % to about 0.5wt %.

3. The method of claim 1, wherein the metal ions are present in the aqueous treating fluid in an amount ranging from about 0.1 mg/L to about 10,000 mg/L.

4. The method of claim 1, wherein the VES surfactant is selected from the group consisting of non-ionic, cationic, amphoteric, and zwitterionic surfactants and combinations thereof.

5. The method of claim 1, wherein the VES surfactant is selected from the group consisting of quaternary ammonium salts, amidoamine oxides, dihydroxyl alkyl glycinate; alkyl ampho acetate or propionate; alkyl betaine; alkyl amidopropyl betaine and alkylimino mono- or di-propionates derived from certain waxes, fats and oils; and combinations thereof.

6. The method of claim 1, wherein the size of the complexation particles ranges from about 1 nm to about 50 microns.

7. The method of claim 1, wherein the complexation particles are nano-sized particles selected from the group consisting of $TiO_2$, ZnO, $Al_2O_3$, and combinations thereof, wherein the nano-sized particles are less than 100 nm.

8. A method for inhibiting or preventing the degradation of a viscoelastic surfactant (VES) comprising adding an effective amount of complexation particles to an aqueous treating fluid having metal ions disposed therein, whereby the effective amount of complexation particles complex at least a portion of the metal ions, wherein the aqueous treating fluid comprises at least one VES and an aqueous base fluid, wherein the effective amount of complexation particles ranges from about 0.0001 wt % to about 0.5 wt %, and wherein the size of the complexation particles ranges from about 1 nm to about 50 microns, wherein the metal ions are selected from the group consisting of a transition metal selected from the group consisting of Groups VA, VIA, VIIA, VIIIA, IE, IIB, IIIB, and IVB of the Periodic Table, and combinations thereof and are those present from impurities in salt products from the aqueous base fluids, aqueous treating fluids, or source water, those present from metal surfaces of mixing and handling equipment, piping, valves, and pumps, wellbore tubing or casing, those present from metal-scale particles, those due to the corrosion of metal surfaces from brine mixing systems and/or stocking tanks, and combinations thereof, and wherein the complexation particles are selected from the group consisting of high cation exchange capacity phyllosilicate mineral particles, zeolites, alkaline earth metal oxides and hydroxides, $TiO_2$ ZnO, $Al_2O_3$, and combinations thereof, wherein the nano-sized particles are less than 100 nm.

9. The method of claim 8, wherein the complexation particles are nano-sized particles selected from the group consisting of $TiO_2$, ZnO, $Al_2O_3$, and combinations thereof.

10. The method of claim 8, wherein the VES surfactant is selected from the group consisting of non-ionic, cationic, amphoteric, and zwitterionic surfactants and combinations thereof.

11. A method for inhibiting or preventing the degradation of a viscoelastic surfactant (VES) comprising:
  adding an effective amount of complexation particles to an aqueous treating fluid having metal ions disposed therein, whereby the effective amount of complexation particles complex at least a portion of the metal ions, wherein the aqueous treating fluid comprises at least one VES and an aqueous base fluid, wherein the metal ions are present in the aqueous treating fluid in an amount ranging from about 0.1 mg/L to about 10,000 mg/L; and
  preventing the degradation of the viscoelastic surfactant (VES) by the metal ions present in the aqueous treating fluid compared to an otherwise identical method absent the complexation particles, wherein the metal ions may be selected from the group consisting of a transition metal selected from the group consisting of Groups VA, VIA, VIIA, VIIIA, IE, IIB, IIIB, and IVB of the Periodic Table, and combinations thereof and are those present from impurities in salt products from the aqueous base fluids, aqueous treating fluids, or source water, those present from metal surfaces of mixing and handling equipment, piping, valves, and pumps, wellbore tubing or casing, those present from metal-scale particles, those due to the corrosion of metal surfaces from brine mixing systems and/or stocking tanks, and combinations thereof, and wherein the complexation particles are selected from the group consisting of high cation exchange capacity phyllosilicate mineral particles zeolites $TiO_2$, $Al_2O_3$, and combinations thereof.

12. The method of claim 11, wherein the VES surfactant is selected from the group consisting of non-ionic, cationic, amphoteric, and zwitterionic surfactants and combinations thereof.

13. The method of claim 11, wherein the size of the complexation particles ranges from about 1 nm to about 50 microns.

14. The method of claim 11, wherein the effective amount of complexation particles ranges from about 0.0001 wt % to about 0.5 wt %.

* * * * *